(12) United States Patent
Lee et al.

(10) Patent No.: US 6,803,981 B2
(45) Date of Patent: Oct. 12, 2004

(54) LIQUID CRYSTAL DISPLAY HAVING BIASED BENDING VERTICAL ALIGNMENT

(75) Inventors: Seok-Lyul Lee, Tao-Yuan Hsien (TW); Kei-Hsiung Yang, Tao-Yuan Hsien (TW)

(73) Assignee: Hannstar Display Corporation, Tao-Yuan Hsien (TW)

( * ) Notice: Subject to any disclaimer, the term of this patent is extended or adjusted under 35 U.S.C. 154(b) by 44 days.

(21) Appl. No.: 10/154,716

(22) Filed: May 24, 2002

(65) Prior Publication Data

US 2003/0218711 A1 Nov. 27, 2003

(51) Int. Cl.⁷ .................... G02F 1/1337; G02F 1/1343
(52) U.S. Cl. .................. 349/129; 349/143; 349/144
(58) Field of Search ............................. 349/129, 143, 349/144

(56) References Cited

U.S. PATENT DOCUMENTS 5,136,407 A * 8/1992 Clerc ........................ 349/146
5,886,762 A * 3/1999 Lee et al. .................. 349/141
6,157,428 A * 12/2000 Koma ....................... 349/138
2003/0107695 A1 * 6/2003 Kubo et al. ................ 349/129

* cited by examiner

Primary Examiner—Tarifur R. Chowdhury
(74) Attorney, Agent, or Firm—Volpe and Koenig, P.C.

(57) ABSTRACT

A liquid crystal display includes a first substrate comprising a first electrode; a second substrate having a switching element disposing thereon a second electrode having a plurality of sub-electrodes and at least one elongate hole having a longitudinal direction and facing to the first electrode, a third electrode positioned under the at least one hole and between the second electrode and the second substrate, connected to a gate electrode or an independent electrode, and having at least one notch disposed on an edge thereof and a longitudinal direction perpendicular to the longitudinal direction of the elongate hole; a liquid crystal layer having a plurality of liquid crystal molecules and interposed between the first substrate and the second substrate. The liquid crystal molecules positioned above and in a vicinity to the hole are aligned to the longitudinal direction of the hole, and the liquid crystal molecules above and in a vicinity to the notch are pointed to a valley of the notch in the presence of a sufficient electric field across the first substrate and the second substrate.

23 Claims, 10 Drawing Sheets

LIQUID CRYSTAL DISPLAY HAVING BIASED BENDING VERTICAL ALIGNMENT

FIELD OF THE INVENTION

The present invention relates to a liquid crystal display, and more particularly, to a liquid crystal display having biased bending vertical alignment.

BACKGROUND OF THE INVENTION

In the conventional liquid display 1 as shown in FIG. 1, the first substrate 10 has a first electrode 11, the second substrate 30 has a second electrode 31, and a liquid crystal layer 20 is disposed between the first electrode 11 and the second electrode 31. The protrusion 12 disposed on the first electrode 11 can divide each pixel area into a plurality of domains. So, each liquid crystal molecules 21 is not vertical but has an angle to the first substrate 10, called multi-domain vertical alignment (MVA). As such, the view angle of a user is increased.

But the manufacture of the protrusion 12 is difficult so the cost of the conventional display 1 is very high and is easy to malfunction.

The other conventional liquid crystal display 4 is shown in FIG. 2. The first substrate 40 has a first electrode 41. The second substrate 60 has a plurality of second electrodes 62 each of which further has sub-electrodes 62' divided by the slit 62a. A third electrode 63 is disposed under the slit 62a so the liquid crystal molecules 51 of the liquid crystal layer 50 is always parallel to the first electrode 41. And the other liquid molecules 52 have an angle to the first electrode 41. The second electrode 62 and the third electrode 63 are disposed separately by insulating film 61.

However, as shown in FIG. 3, the liquid crystal molecules 53 far from the third electrode 63 is pointed to the third electrode 63. But when an electric field is present across between the first and second substrates 40 and 60, the liquid crystal molecules 51 above the slit 62a is tilted and flows along the longitudinal direction of the third electrode 63 first, and after a period of time, the liquid crystal molecules 51 then rotates as the liquid crystal molecules 53. It causes the slow responding time.

Another problem is that the liquid crystal molecules 52 above the edge 63' of the third electrode 63 will rotate suddenly because of the electric field resulting from the overlapping of the second electrode 62 and third electrode 63. The unstable states of the liquid crystal molecules 52 not only cause the slow responding time but also cause the flicker of the liquid crystal display 4.

SUMMARY OF THE INVENTION

It is an object of the present invention to provide a liquid crystal display having a short responding time.

It is another object of the present invention to provide a liquid crystal with flicker-free.

According to one preferred embodiment of the present invention, a liquid crystal display comprises a first substrate comprising a first electrode; a second substrate which disposing thereon a second electrode having a plurality of sub-electrodes and at least one elongate hole having a longitudinal direction and facing to the first electrode, a third electrode positioned under the at least one hole and between the second electrode and the second substrate, connected to a gate electrode or an independent electrode, and having at least one notch disposed on an edge thereof and a longitudinal direction perpendicular to the longitudinal direction of the elongate hole; a liquid crystal layer comprising a plurality of liquid crystal molecules and interposed between the first substrate and the second substrate; then the liquid crystal molecules above and in a vicinity to the hole are aligned to the longitudinal direction of the hole, and the liquid crystal molecules above and in a vicinity to the notch are pointed to a valley of the notch in a present of sufficient electric field across the first substrate and the second substrate.

The liquid crystal molecules in the liquid crystals display preferably are negative dielectric anisotropy material.

Certainly, the second electrode can be further divided to a plurality of sub-electrodes by a plurality of slits.

Certainly, the second electrode can further comprise a plurality of gaps aligned said slit and pointed to said third electrode.

The switching element preferably further connects to said second electrode.

The first electrode is preferably made of a transparent material.

The second electrode is preferably made of a transparent material.

The third electrode is preferably made of a non-transparent material.

The third electrode is preferably connected to a gate electrode.

The third electrode is preferably connected to an independent electrode.

The second electrode is preferably connected to a switching element.

In accordance with another aspect of the present invention, a liquid crystal display comprises a first substrate comprising a first electrode, a second substrate comprising a second electrode having at least one elongate hole having a longitudinal direction and facing to the first electrode, the second substrate further comprising a third electrode positioned under the at least one hole, and a liquid crystal layer comprising a plurality of liquid crystal molecules and interposed between the first substrate and the second substrate, wherein the liquid crystal molecules above and in a vicinity to the hole are aligned to the longitudinal direction of the hole in a presented of a sufficient electric field across the first substrate and the second substrate.

Preferably the second substrate further comprises a switching element electrically connected to the second electrode.

The second electrode preferably has at least one sub-electrode.

DETAILED DESCRIPTION OF THE PREFERRED EMBODIMENT

Figure 1:
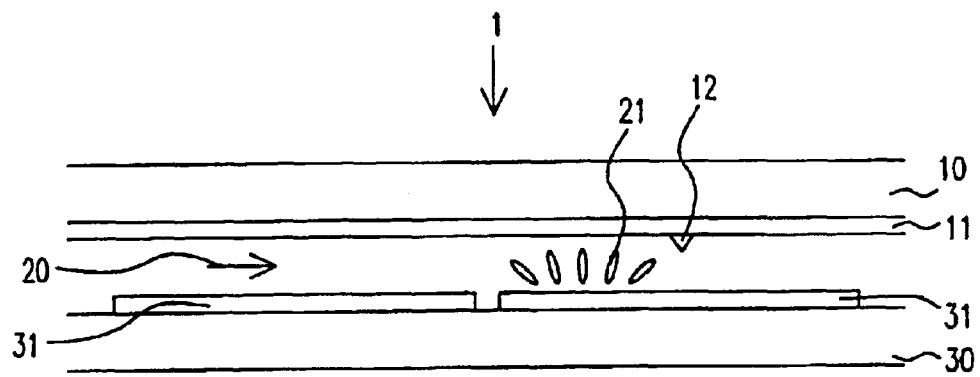
FIG. 1 is a cross-sectional view of a conventional liquid crystal display.
Figure 2:
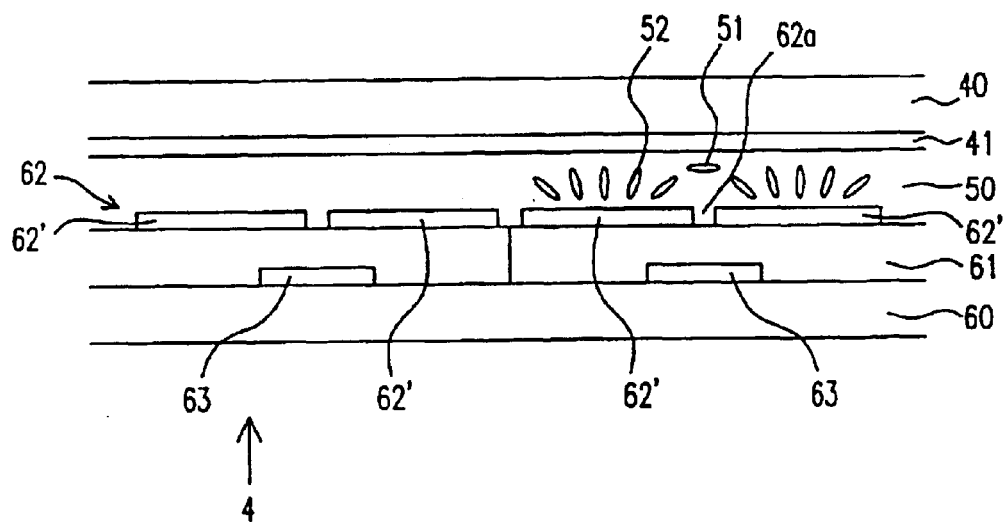
FIG. 2 is a cross-sectional view of another conventional liquid crystal display.
Figure 3:
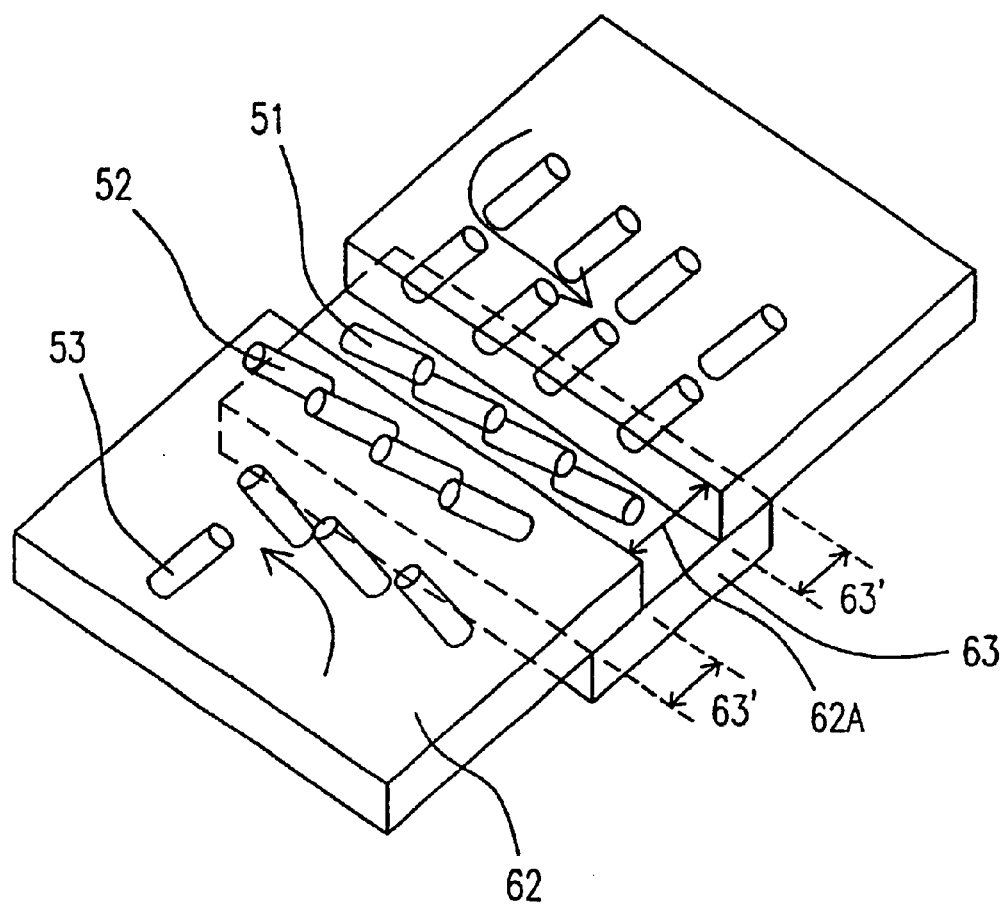
FIG. 3 is a perspective view of the structure of the second electrode and the third electrode in FIG. 2.
Figure 4:
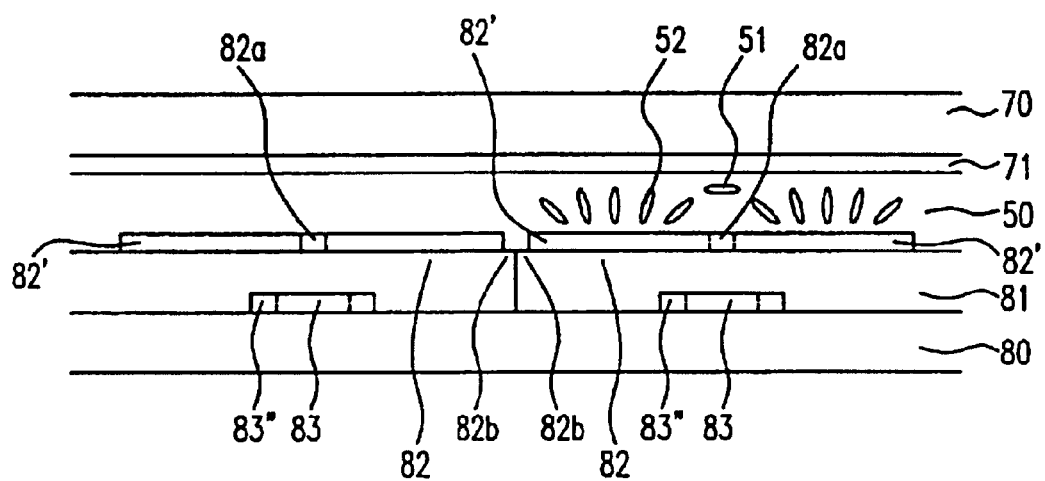
FIG. 4 is a cross-section view of a liquid crystal display according to the present invention.
Figure 8:
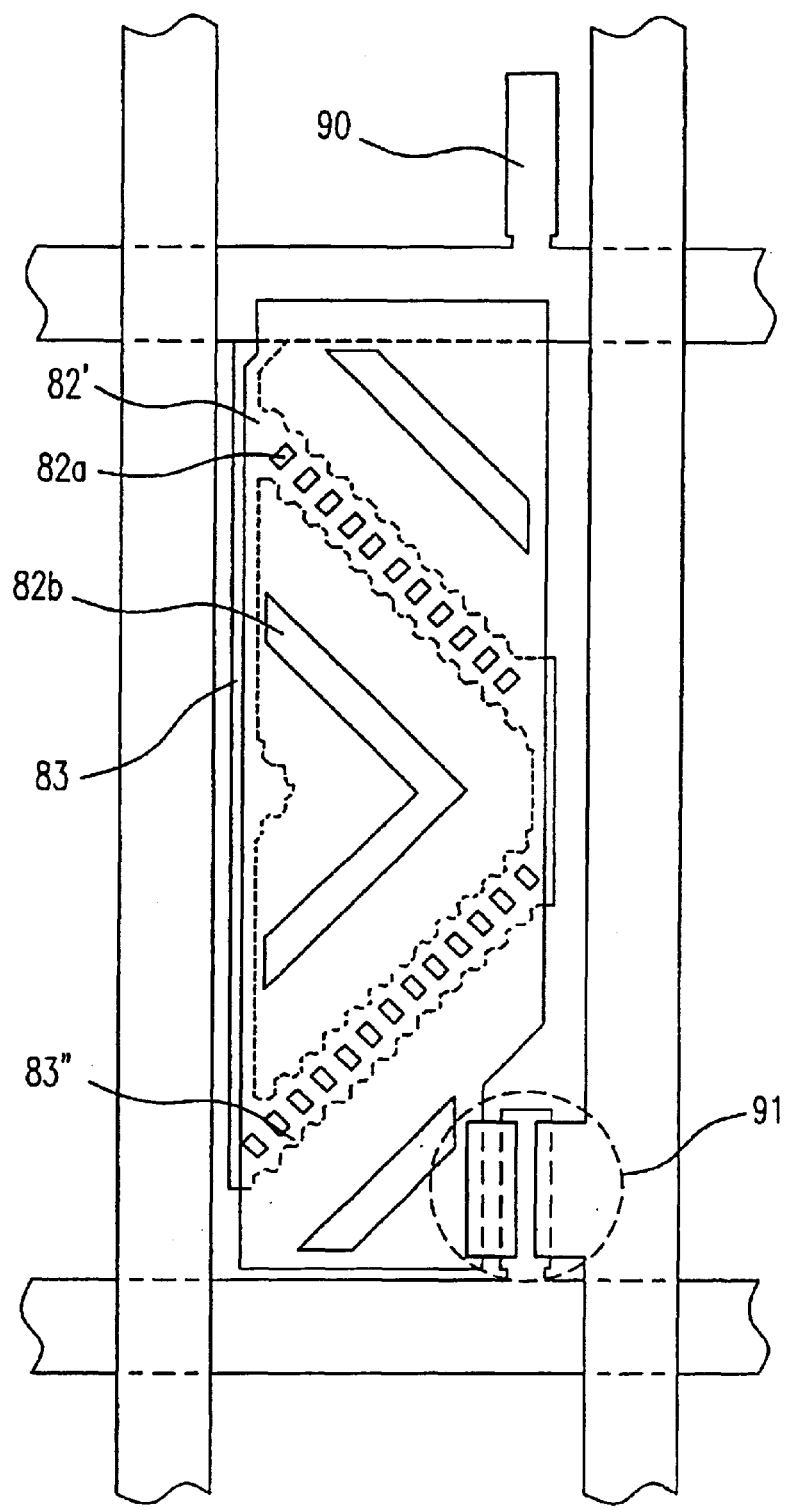
FIG. 8 is a top view of a first embodiment of a second substrate according to the present invention.

According to the FIG. 4, there is shown the cross-sectional view of the present invention. The second electrode 82 has at least one hole 82a above the third electrode 83. The liquid crystal layer 50 is interposed between the first electrode 71 of the first substrate 70 and the second electrode 82 of the second substrate 80. The slit 82b divides the second electrode 82 into a plurality of sub-electrodes 82'. The edge 83' of the third electrode 83 is formed with at least one notch 83". The second electrode 82 and the third electrode 83 are separated by insulating film 81, and the second electrode 82 is connected to a switching element 91 (FIG. 8).

Figure 5:
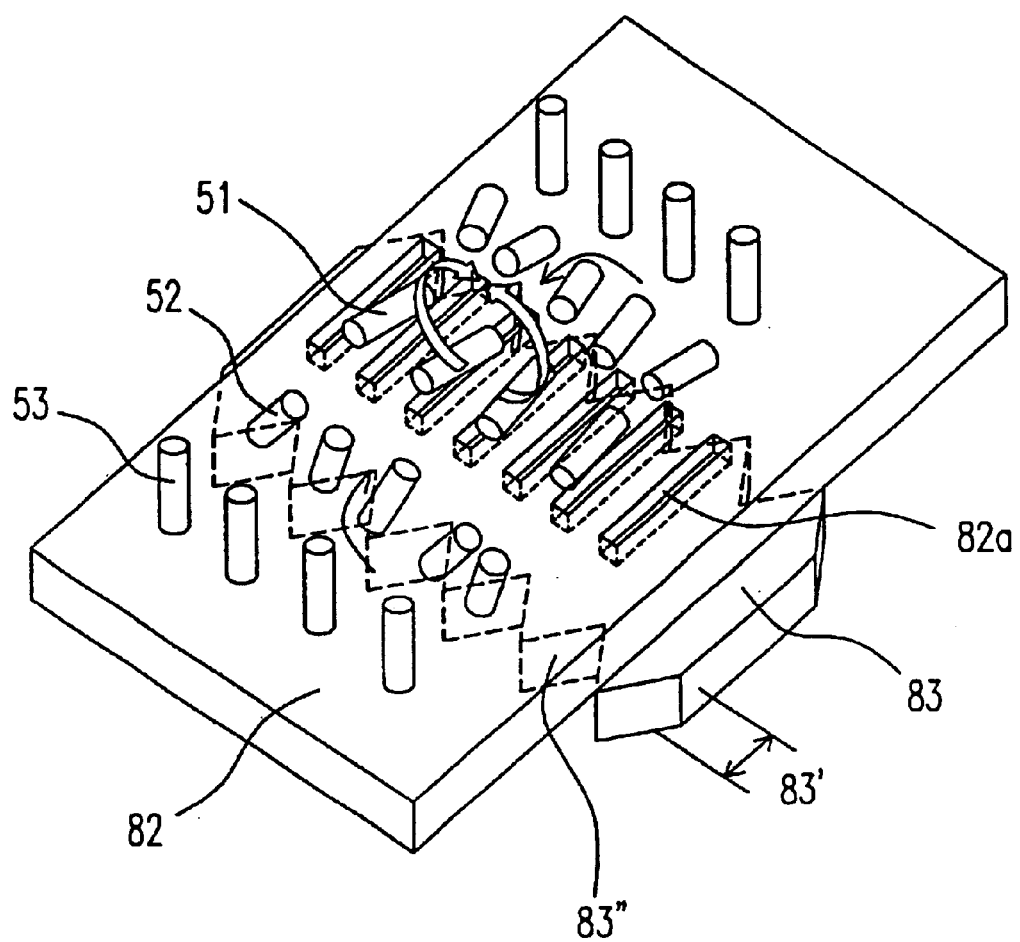
FIG. 5 is a perspective view of the structure of the second electrode and the third electrode in FIG. 4.

According to FIG. 5, the holes 82a is elongate, and in the present of a sufficient electric field across the first and second substrates 70 and 80 (FIG. 4), the liquid crystal molecules 51 will tilt along the longitudinal direction of the hole 82a because of the fringe electric field. So the tilted direction of the liquid crystal molecules 51 is perpendicular to the longitudinal direction of the third electrode 83. The notch 83" also has a oblique electric field to push the liquid crystal molecules 52 to be pointed to the center above the third electrode 83, as same as the tilt direction of the liquid crystal molecules 53.

Figure 6:
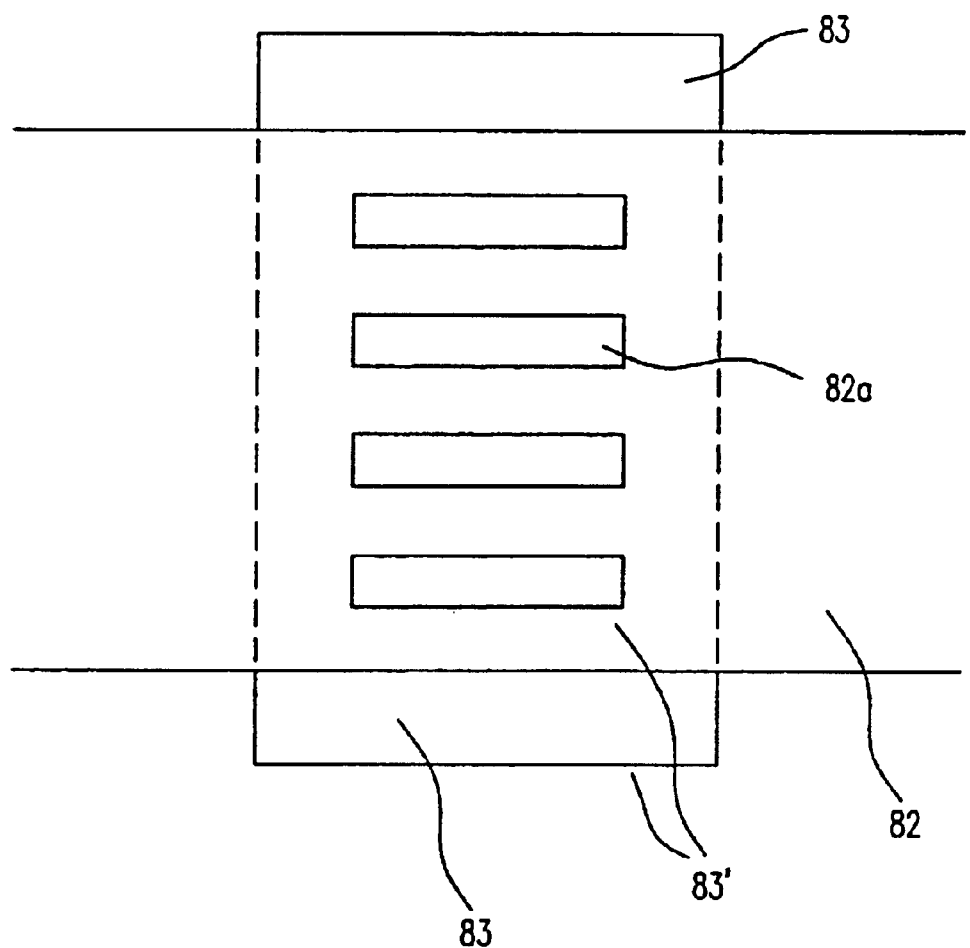
FIG. 6 is a top view of the structure of the second electrode and the third electrode of a first embodiment of the present invention.

According to the FIG. 6, the second electrode 82 has a plurality of holes 82a above the third electrode 83 to create the fringe electric field, and to force the liquid crystal molecules 51 to tilt as shown in FIG. 5.

Figure 7:
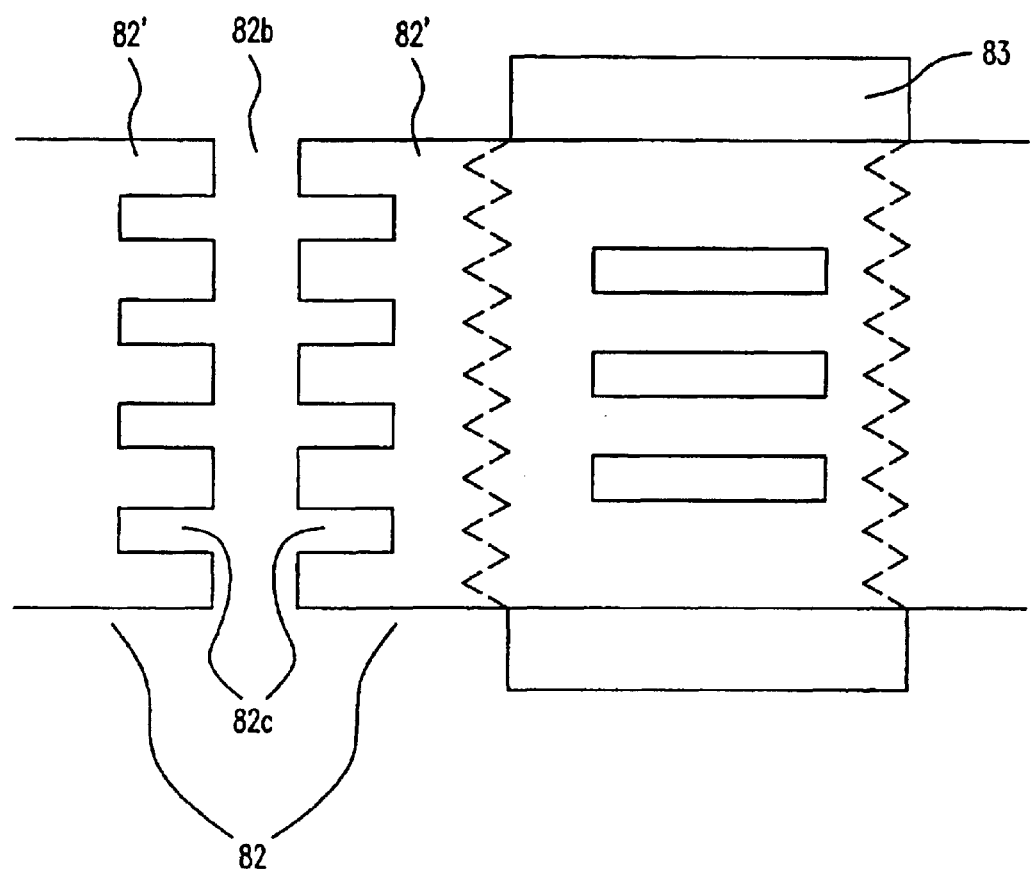
FIG. 7 is a top view showing the gap formed on the second electrode.

According to the FIG. 7, the sub-electrode 82' of the second electrode 82 also comprises a plurality of gaps 82c respectively aligned with the slits 82b (FIG. 4) and pointed to the third electrode 83. The gaps 82c generate a fringe electric field to restrict that the liquid crystal molecules in the liquid crystal layer 50 would be recovered to original arrangement easily when the liquid crystal molecule is disordered by an outer force presses.

FIG. 8 shows the top view of the first embodiment of the substrate according to the present invention in practice. The second electrode 82 is divided into several sub-electrodes 82' by the slit 82b. The third electrode 83 is disposed under the second electrode 82 and the holes 82a. The notch 83" is formed on the third electrode 83. The third electrode 83 is connected to the gate electrode 90, so the third electrode 83 will be activated simultaneously with the gate electrode 90. The second electrode 82 is connected to a switching element 91.

Figure 9:
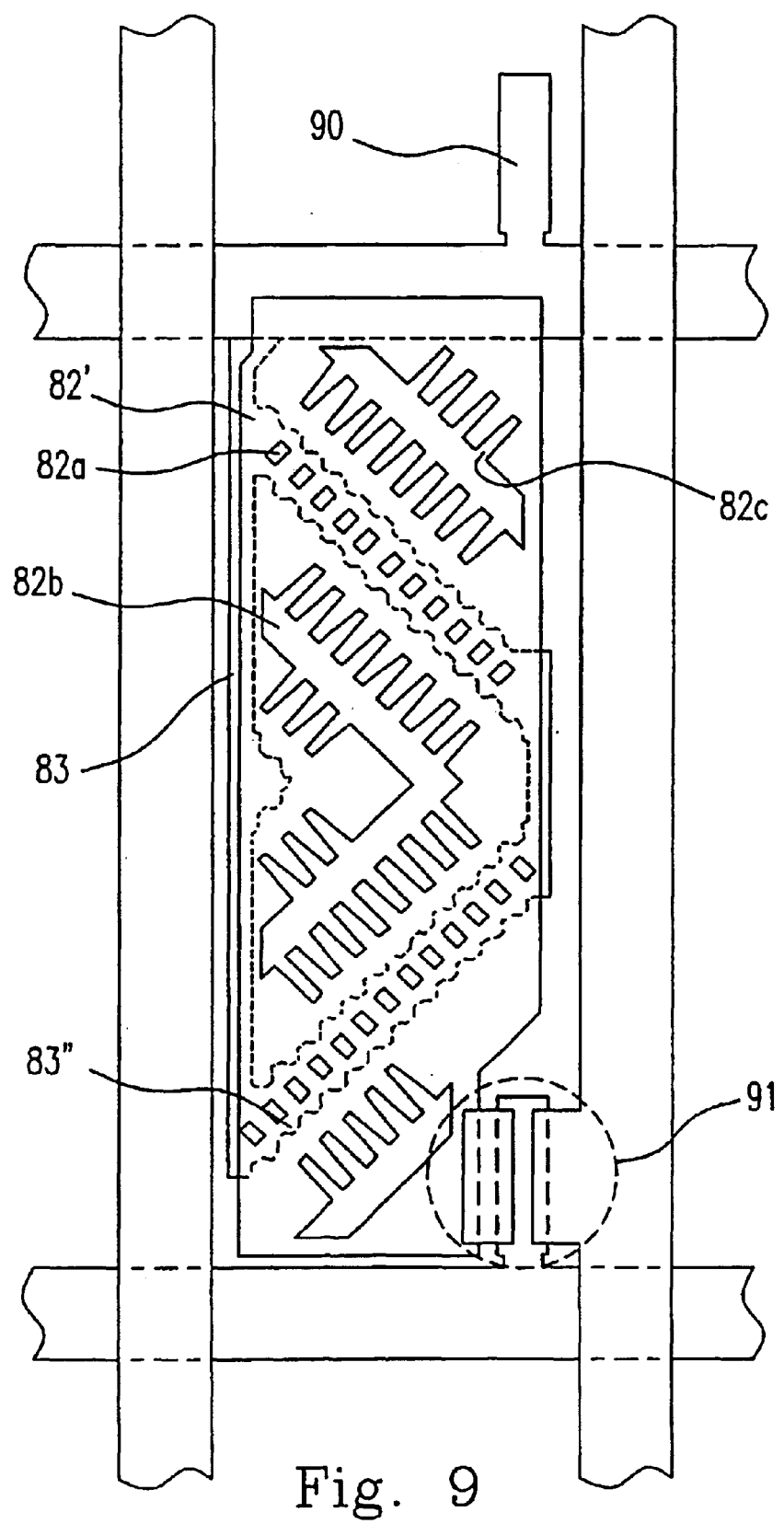
FIG. 9 is a top view of a second embodiment of a second substrate according to the present invention.

FIG. 9 shows another top view of the second embodiment of the second substrate 80 (FIG. 4) according to the present invention in practice. The third electrode 83 electrically connects to the gate electrode 90. And the second electrode 82 further comprises gaps 82c respectively aligned with the slits 82b. The second electrode 82 is connected to a switching element 91.

Figure 10:
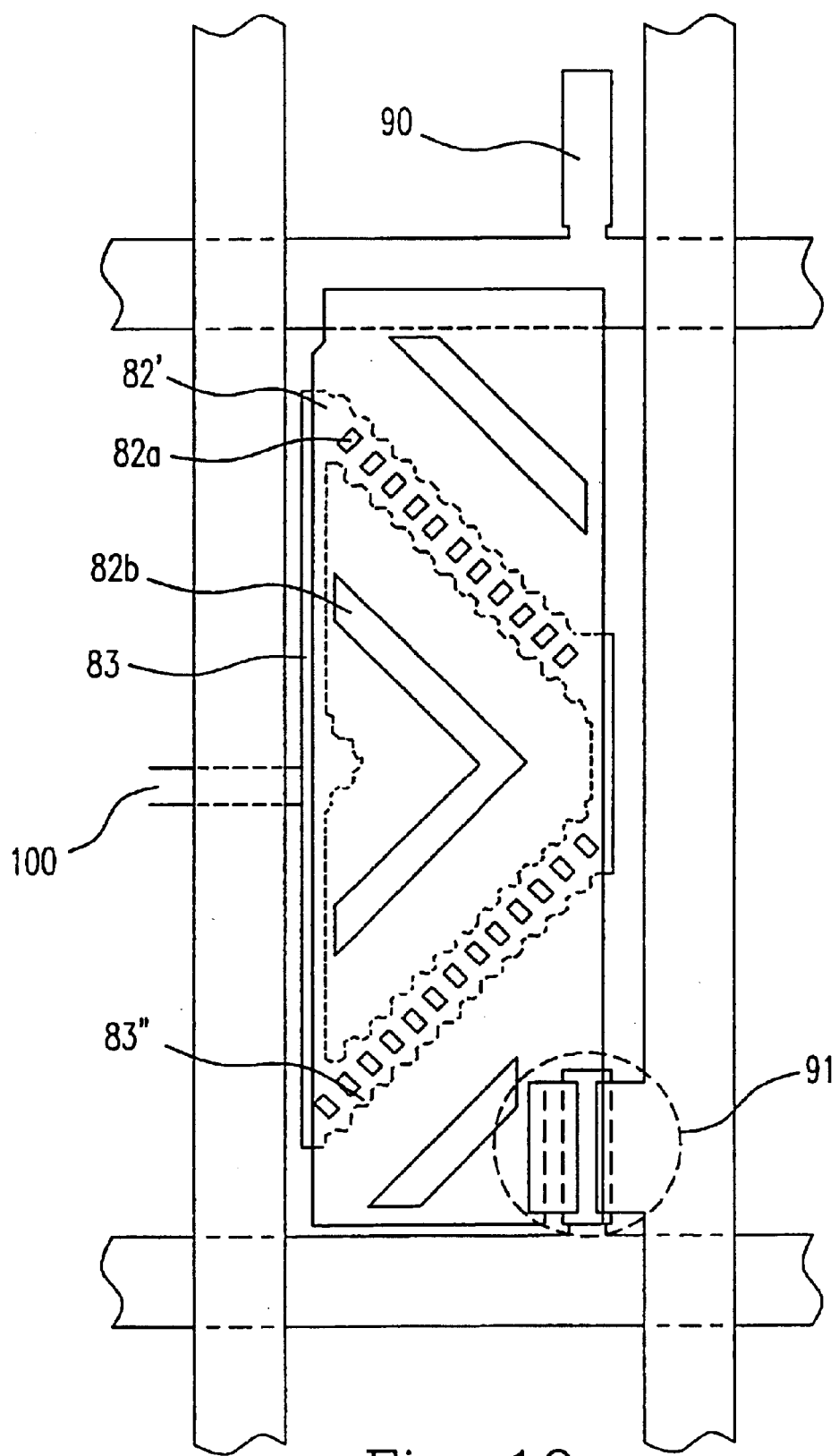
FIG. 10 is a top view of a third embodiment of a second substrate according to the present invention.

FIG. 10 shows a further top view of the third embodiment of the second substrate 80 (FIG. 4) according to the present invention in practice. The third electrode 83 is disposed under the second electrode 82 and the holes 82a. But the third electrode 83 is not connected with the gate electrode 90. The third electrode 83 connects to an independent electrode 100, so gate signal delay time of the present invention will decrease. The second electrode 82 is connected to a switching element 91.

Figure 11:
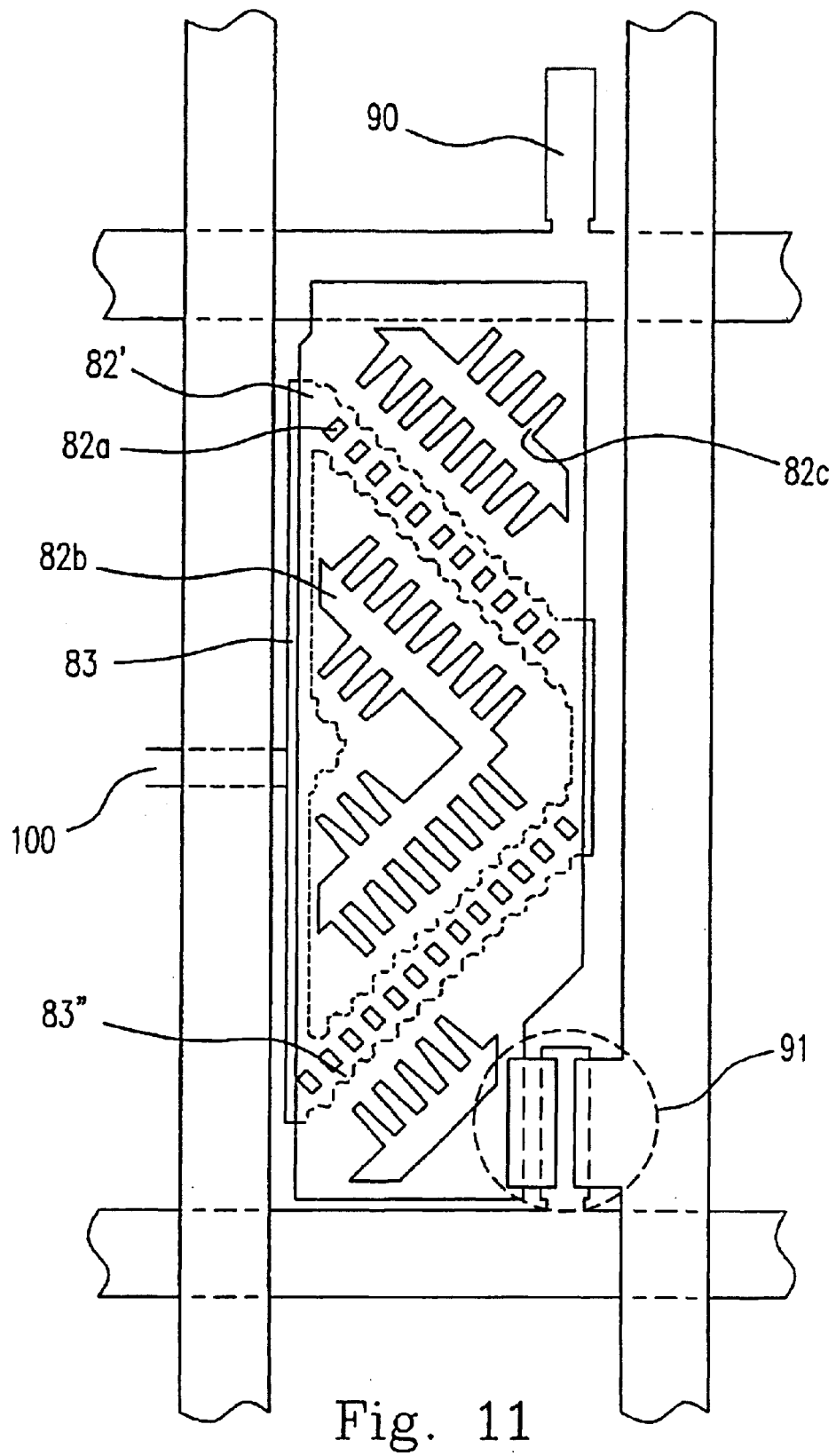
FIG. 11 is a top view of a fourth embodiment of a second substrate according to the present invention.

FIG. 11 shows further a top view of the fourth embodiment of the second substrate according to the present invention in practice. The third electrode 83 is disposed under the second electrode 82 and the holes 82a. But the third electrode 83 is not connected with the gate electrode 90. The second electrode 82 further comprises the gaps 82c respectively aligned with the slits 82b. The third electrode 83 connects to an independent electrode 100, so the gate signal delay time of the present invention can decrease. The second electrode 82 is connected to a switching element 91.

While the invention has been described in terms of what are presently considered to be the most practical and preferred embodiments, it is to be understood that the invention needs not be limited to the disclosed embodiment. On contrary, it is intended to cover various modifications and similar arrangements included within the spirit and scope of the appended claims which are to be accorded with the broadest interpretation so as to encompass all such modifications and similar structures.

What is claim is:

1. A liquid crystal display comprising:
   a first substrate comprising a first electrode;
   a second substrate comprising thereon a second electrode having a plurality of sub-electrodes and at least one elongate hole having a longitudinal direction and facing to said first electrode; a third electrode positioned under said at least one hole and between said second electrode and said second substrate, and having at least one notch disposed on an edge thereof and a longitudinal direction perpendicular to said longitudinal direction of said elongate hole; and
   a liquid crystal layer comprising a plurality of liquid crystal molecules and interposed between said first substrate and said second substrate;
   wherein said liquid crystal molecules above and in a vicinity to said hole are aligned to said longitudinal direction of said hole, and said liquid crystal molecules above and in a vicinity to said notch are pointed to a valley of said notch in presence of a sufficient electric field across said first substrate and said second substrate.

2. The liquid crystal display of claim 1, wherein said liquid crystal molecules are negative dielectric anisotropy material.

3. The liquid crystal display of claim 1, wherein said second electrode is divided into said plurality of sub-electrodes by a plurality of slits.

4. The liquid crystal display of claim 3, wherein said second electrode further comprises a plurality of gaps respectively aligned with said slit and pointed to said third electrode.

5. The liquid crystal display of claim 1, wherein said first electrode is made of a transparent material.

6. The liquid crystal display of claim 1, wherein said second electrode is made of a transparent material.

7. The liquid crystal display of claim 1, wherein said third electrode is made of a non-transparent material.

8. The liquid crystal display of claim 1, wherein said third electrode is electrically connected to a gate electrode.

9. The liquid crystal display of claim 1, wherein said third electrode is electrically connected to an independent electrode.

10. The liquid crystal display of claim 1, wherein said second electrode is electrically connected to a switching element.

11. A liquid crystal display comprising:

a first substrate comprising a first electrode;

a second substrate comprising a second electrode, the second electrode being divided into sub-electrodes by a slit, the sub-electrodes having at least one elongate hole having a longitudinal direction and facing to said first electrode, said second substrate further comprising a third electrode positioned under said at least one hole; and a liquid crystal layer comprising a plurality of liquid crystal molecules and interposed between said first substrate and said second substrate, wherein said liquid crystal molecules above and in a vicinity to said hole are aligned to said longitudinal direction of said hole in presence of a sufficient electric field across said first substrate and said second substrate.

12. The liquid crystal display of claim 11, wherein said second substrate further comprises a switching element electrically connected to said second electrode.

13. The liquid crystal display of claim 11, wherein said second electrode has at least one sub-electrode.

14. The liquid crystal display of claim 11, wherein said at least one hole is disposed above an edge of said third electrode.

15. The liquid crystal display of claim 11, wherein said liquid crystal molecules are negative dielectric anisotropy material.

16. The liquid crystal display of claim 11, wherein said second electrode is divided into a plurality of sub-electrodes by a plurality of slits.

17. The liquid crystal display of claim 16, wherein said second electrode further comprises a plurality of gaps respectively aligned with said slits and pointed to said third electrode.

18. The liquid crystal display of claim 11, wherein said first electrode is made of a transparent material.

19. The liquid crystal display of claim 11, wherein said second electrode is made of a transparent material.

20. The liquid crystal display of claim 11, wherein said third electrode is made of a non-transparent material.

21. The liquid crystal display of claim 11, wherein said third electrode is electrically connected to a gate electrode.

22. The liquid crystal display of claim 11, wherein said third electrode is electrically connected to an independent electrode.

23. The liquid crystal display of claim 11, wherein said second electrode is located between said first and said third electrodes.

* * * * *